United States Patent
Osterfeld

(10) Patent No.: US 8,900,672 B2
(45) Date of Patent: Dec. 2, 2014

(54) METHOD OF APPLYING INDICIA TO AN ITEM HAVING A TEXTURED SURFACE

(75) Inventor: Gary Joseph Osterfeld, Coldwater, OH (US)

(73) Assignee: Fram Group IP LLC, Lake Forest, IL (US)

( * ) Notice: Subject to any disclaimer, the term of this patent is extended or adjusted under 35 U.S.C. 154(b) by 453 days.

(21) Appl. No.: 13/248,750

(22) Filed: Sep. 29, 2011

(65) Prior Publication Data
US 2012/0074055 A1    Mar. 29, 2012

Related U.S. Application Data

(60) Provisional application No. 61/387,759, filed on Sep. 29, 2010.

(51) Int. Cl.
| | | |
|---|---|---|
| B05D 1/06 | (2006.01) | |
| B05D 1/28 | (2006.01) | |
| B01D 35/00 | (2006.01) | |
| B01D 35/30 | (2006.01) | |
| B41F 3/34 | (2006.01) | |
| B41F 17/00 | (2006.01) | |
| B05D 5/02 | (2006.01) | |
| B05D 5/06 | (2006.01) | |
| B05D 7/00 | (2006.01) | |

(52) U.S. Cl.
CPC .............. *B01D 35/005* (2013.01); *B01D 35/30* (2013.01); *B41F 3/34* (2013.01); *B41F 17/006* (2013.01); *B01D 2201/50* (2013.01); *B05D 5/02* (2013.01); *B05D 5/06* (2013.01); *B05D 7/546* (2013.01); *B05D 2451/00* (2013.01)
USPC ...... 427/475; 427/258; 427/261; 427/428.12; 427/558

(58) Field of Classification Search
USPC ..................... 427/475, 258, 261, 558, 428.12
See application file for complete search history.

(56) References Cited

U.S. PATENT DOCUMENTS

| | | | | | |
|---|---|---|---|---|---|
| 3,385,209 | A | * | 5/1968 | Freres | 101/38.1 |
| 5,834,067 | A | * | 11/1998 | Rodely | 427/469 |
| 6,080,310 | A | * | 6/2000 | Bolser et al. | 210/238 |
| 6,220,154 | B1 | | 4/2001 | Coningsby | |
| 6,526,880 | B2 | | 3/2003 | Coningsby | |
| 6,907,822 | B2 | | 6/2005 | Coningsby | |

OTHER PUBLICATIONS http://www.flexapex.com/flexapex.html.
http://www.nordson.com/en-us/divisions/industrial-coating/products/Powder-Coating/Pages/Default.aspx.

* cited by examiner

*Primary Examiner* — Frederick Parker
(74) *Attorney, Agent, or Firm* — Erin J. Fox; Barnes & Thornburg LLP

(57) ABSTRACT

A method of applying indicia to an item having a textured surface is disclosed herein, the method including the steps of: applying a textured paint to an exterior surface of the item; and applying the indicia to the exterior surface by an offset printing process. Also disclosed herein is a fluid filter having: a housing having an exterior surface; a textured paint applied to the exterior surface; and indicia applied to the textured paint, wherein the indicia is applied by an offset printing process.

19 Claims, 4 Drawing Sheets

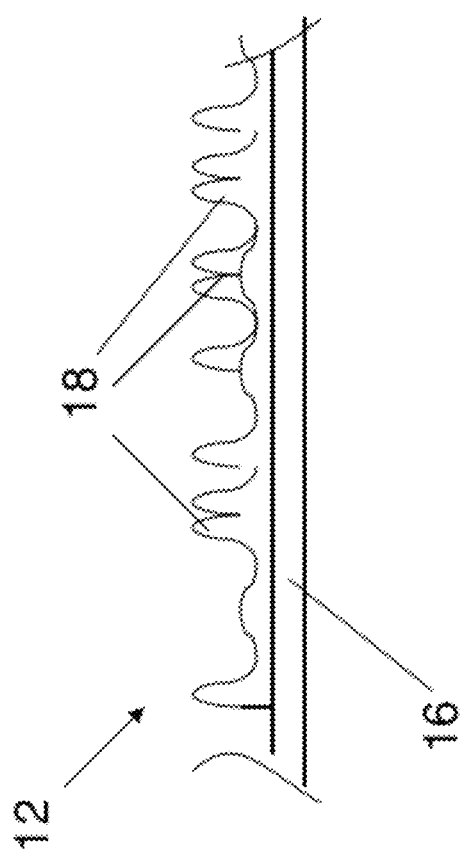

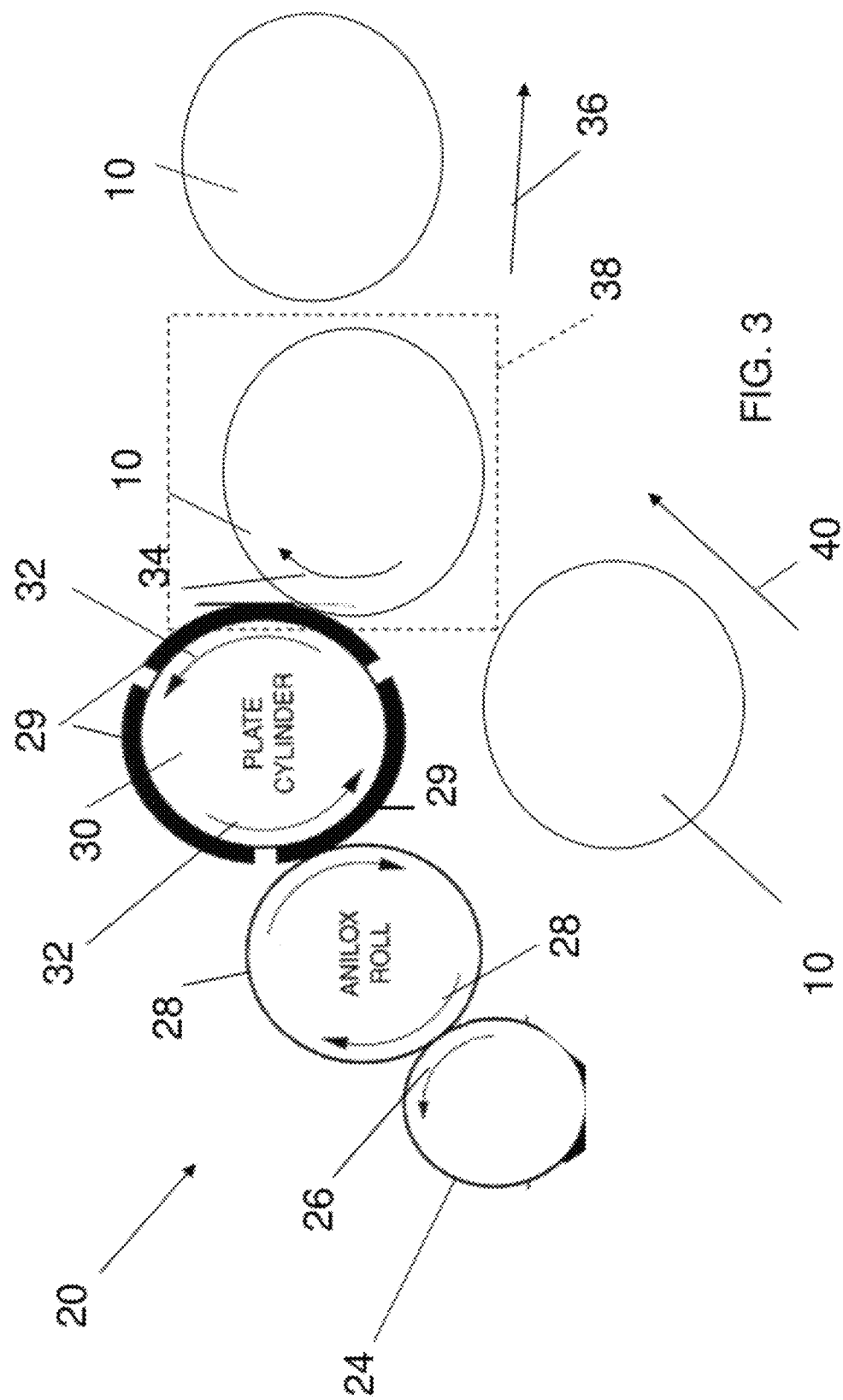

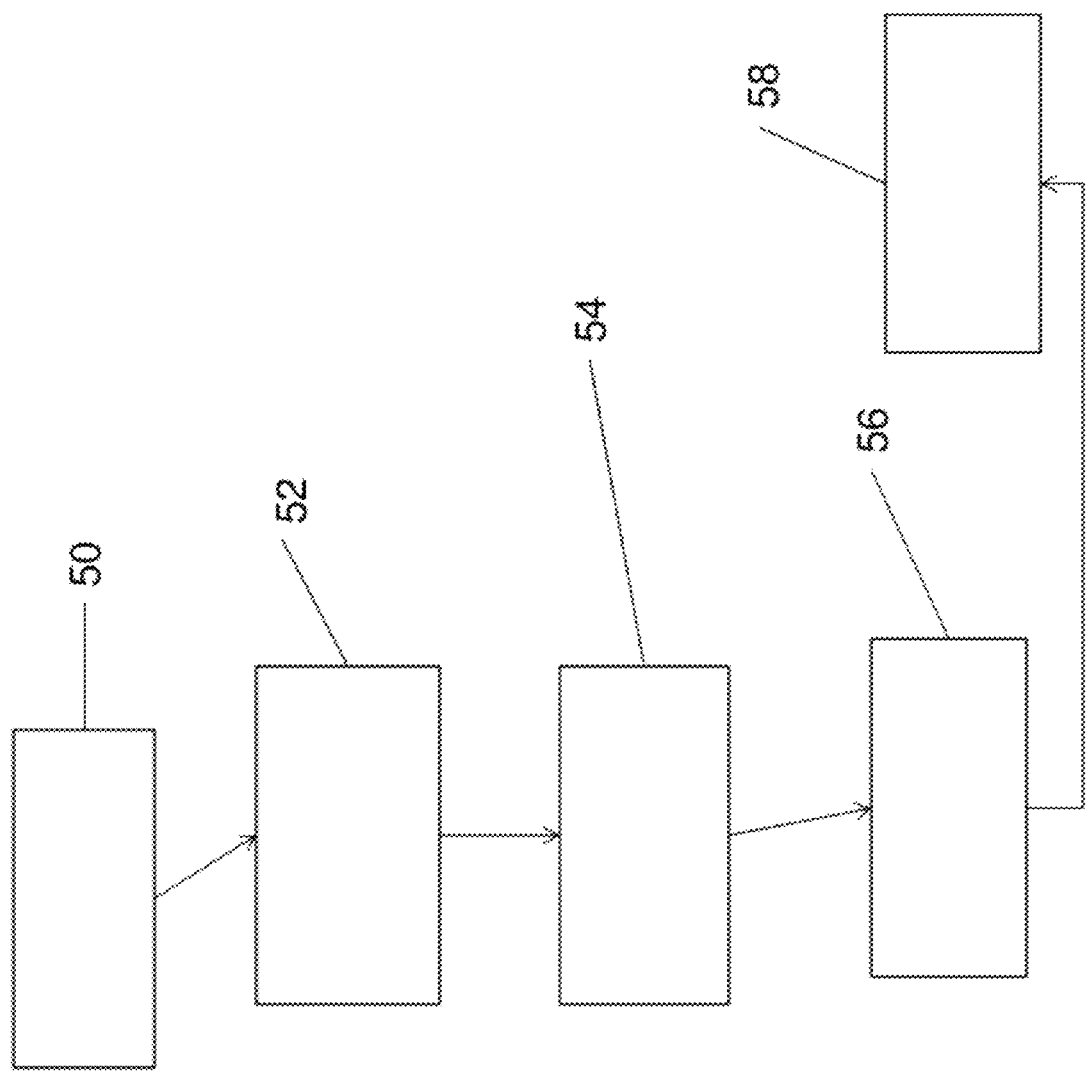

METHOD OF APPLYING INDICIA TO AN ITEM HAVING A TEXTURED SURFACE

CROSS REFERENCE TO RELATED APPLICATIONS

This application claims the benefit of U.S. Provisional Patent Application Ser. No. 61/387,759 filed Sep. 29, 2010, the contents of which are incorporated herein by reference thereto.

BACKGROUND

Many types of fluid filters are used in engine lubrication systems, hydraulic systems and fuel systems to remove particles from the fluid being circulated. Typically, these filters are secured to and removed from these systems by engaging a threaded spud. In order to facilitate gripping of these filters an exterior surface of the filter is configured to have a textured surface such that gripping of the same by a hand or tool is enhanced. Furthermore and in order to provide the necessary markings to the commercial embodiment it is necessary to provide indicia to the exterior surface of the filter.

Accordingly, it is desirable to provide an item with indicia disposed on a textured surface in a cost-efficient manner and a method for applying the indicia.

SUMMARY

Exemplary embodiments of the present invention are directed to a method of applying indicia to an item having a textured surface, the method including the steps of: applying a textured paint to an exterior surface of the item; and applying the indicia to the exterior surface by an offset printing process.

Also disclosed herein is a fluid filter having: a housing having an exterior surface; a textured paint applied to the exterior surface; and indicia applied to the textured paint, wherein the indicia is applied by an offset printing process.

In another exemplary embodiment, a method of applying indicia to an item having a textured surface is provided, the method including the steps of: applying a textured paint to an exterior round surface of an item via an electrostatic process; curing the textured paint on the exterior round surface; and applying the indicia to the exterior round surface by an offset printing process after the textured paint has been cured, wherein the indicia is an ink that is first transferred to an etched anilox roll, which then transfers the ink to a plurality of pads and the plurality of pads apply the ink to the exterior round surface/

BRIEF DESCRIPTION OF DRAWINGS

FIG. 2 illustrates a cross sectional view of the filter illustrated in FIG. 1;

FIG. 3 illustrates an apparatus for applying indicia to an item with a textured surface; and FIG. 4 illustrates one non-limiting method of applying the indicia to the item in accordance with an exemplary embodiment of the present invention.

DESCRIPTION OF EXEMPLARY EMBODIMENTS

Figure 1:
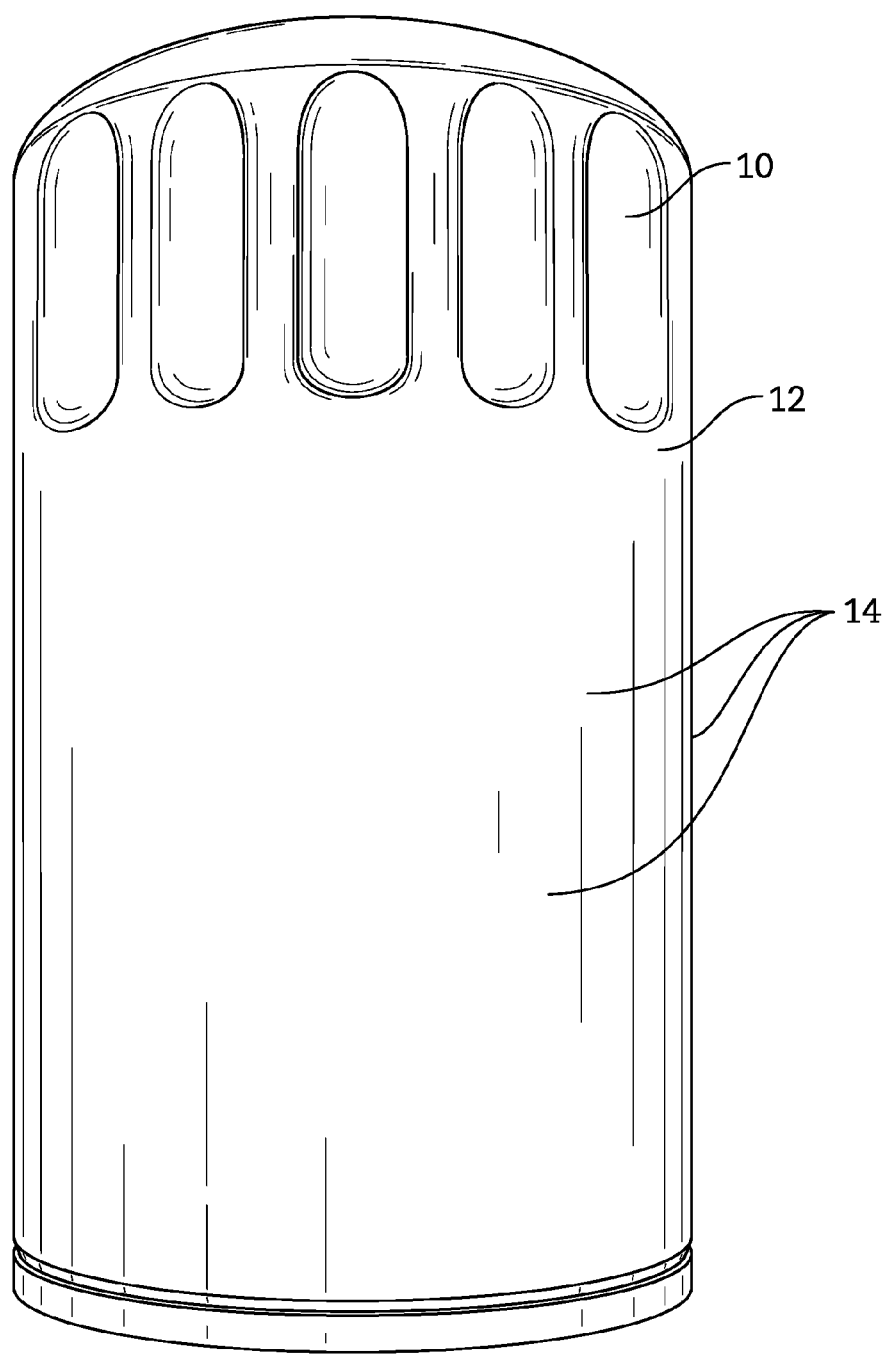
FIG. 1 illustrates an oil filter formed in accordance with an exemplary embodiment of the present invention.

Referring now to FIGS., a filtering device or item 10 is shown manufactured according to an exemplary embodiment of the present invention. The item or filter 10 is configured to be mounted onto a filter mount of an engine or other liquid system requiring filtration. The filter 10 is adapted to be operably mounted to and in communication with a lubrication system, hydraulic system, fuel system, or other fluid circulation-type systems that benefit from fluid filtration provided by the assembly. In one application, the filter mount has a threaded spud portion that engages a threaded opening of the filter. Thus, an exterior surface 12 of the filter is grasped by a user's hand or tool to remove and apply the filter. Accordingly, the exterior surface 12 do the housing of the filter will be round or have a cylindrical shape. In order to make this surface easier to grasp especially with the filter being in an environment that would allow the same to be coated with greases, oils, etc. that would make this surface hard to grasp the exterior surface is coated with a textured paint providing a rough surface. However, this round textured surface now poses problems for applying suitable indicia for use in the commercial products.

Thereafter and in accordance with an exemplary embodiment of the present invention indicia 14 is applied to the filter via a dry offset printing process. A non-limiting cross-sectional view of the textured surface is illustrated in FIG. 2 where the filter housing 16 and the irregular surface of the textured paint 18 is illustrated.

In order to create this textured surface, specially formulated textured powder paint is applied using a NORDSON electrostatic powder paint system. This system operates by electrostatically charging the powder paint particles and applying them to the grounded product (e.g., item or oil filter) using compressed air to blow the charged material onto the surface in a uniform manner. This dry powder is then liquefied and cured by passing through an infrared oven to bake the finish onto the substrate.

After passing through a cooling tunnel, the part would directly flow into a printing system 20 for decoration or application of the appropriate markings. Additional information on the aforementioned NORDSON automatic powder coating systems can be found at here: http://www.nordson-.com/en-us/divisions/industrial-coating/products/Powder-Coating/Pages/Defaultaspx. Other commercially textured paints are available from Spraylat, Sherwin Williams, Valspar and Akzo Nobel.

Thereafter, the item with the textured surface will be sent to a printing system 20 wherein the indicia is applied. In one non-limiting exemplary embodiment, the indicia is applied by a FLEXAPEX offset printing process or similar process available from APEXMACHINE Company or others that utilize inking technologies and UV (ultraviolet) cured inks in combination with a dry offset printing process, which allows for the use of multi-colors at high speeds. Other contemplated printing methods include silk screening, high resolution inkjet and equivalents thereof. Some of these processes are available from the following companies Kamen, Allied Decorating Systems (Silkscreen) and Tonjet (High Resolution Inkjet).

A general description of this process can be found at: http://www.flexapex.com/flexapex.html.

Referring to FIG. 3, a non-limiting schematic of the printing system 20 is illustrated. Here an etched anilox roll 22 receives ink from another roll or application system or any other suitable process 24. In one embodiment roll 24 is rotating in a direction of the arrow 26 and roll 22 is rotating in the direction of arrow 28. As roll 22 rotates in the direction or arrow 28 the applied ink is transferred to pads 29 of a rotating cylinder 30. Cylinder 30 rotates in the direction of arrow 32 and the pads 29 make contact with the textured surface of the item or oil filter 10, which rotates in a direction of arrow 34 and applies the ink to the textured surface of the oil filter. Thereafter, the item with the ink applied is moved in the direction of the arrow 36 towards a UV curing station of system 20. In addition, an un-inked (e.g., previously painted with a textured paint) item 10 is fed into a machine or other equivalent device 38 in a direction of arrow 40 wherein device 38 is configured to rotate the item in the direction of arrow 34 such that the ink is applied by cylinder 30.

In accordance with an exemplary embodiment of the present invention and by using an engraved anilox roll specific etched depths are provided on roll 22 and thus a sufficient amount of ink or other equivalent material is applied to the three-dimensional textured surface of the item 10 via the pads 29. In so doing, the applied indicia is visible on a textured surface and thus, lower cost materials such as inks as opposed to higher cost labels and/or sleeves are capable of being applied to the item which lowers the overall manufacturing costs associated therewith.

By using the aforementioned offset process, large volumes of ink are available for the printing of the indicia on the item. In one embodiment, the textured paint is a first color and the indicia or ink is a second color, wherein the first color is different from the second color.

Although an oil filter is illustrated as one contemplated embodiment, it is understood that exemplary embodiments of the present invention can be applied to other items having textured surfaces and exemplary embodiments of the present invention are not specifically limited to oil filters.

FIG. 4 illustrates a method of applying the ink to a textured surface of an oil filter in accordance with one non-limiting exemplary embodiment of the present invention. In a first step 50, the surface of the item or the oil filter has a textured powder paint applied to an exterior surface thereof by electrostatically charging the powder paint particles and applying them to the grounded product (e.g., the item or oil filter) using compressed air to blow the charged material onto the surface in a uniform manner. This dry powder is then liquefied and cured onto the exterior surface of the filter or item by passing the same through an infrared oven to bake the finish onto the substrate at step 52.

Thereafter, the item is passed through a cooling tunnel at step 54. Once cooled, the oil filter housing or part (e.g., item) is then transferred to printing system 20 or equivalents thereof at step 56 for decoration or application of the appropriate markings.

As mentioned above and at step 56 the indicia is an ink applied via an offset printing process or similar process available from APEXMACHINE Company or others that utilize inking technologies and UV (ultraviolet) cured inks in combination with a dry offset printing process, which allows for the use of multi-colors at high speeds. A general description of this process can be found at: http://www.flexapex.com/flexapex.html. Reference is also made to the following U.S. Pat. Nos. 6,907,822; 6,526,880; and 6,220,154 the contents each of which are incorporated herein by reference thereto.

Once the ink is applied using system 20 at step 56, the item or oil filter with the ink applied thereon is advanced towards a UV curing station at step 58.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims and their legal equivalence.

What is claimed is:

1. A method of applying indicia to an item having a textured surface, comprising:

applying a textured paint to an exterior surface of the item; and applying the indicia to the painted exterior surface by an offset printing process, wherein the indicia is an ink that is first transferred to an etched anilox roll, which then transfers the ink to a plurality of pads and the plurality of pads apply the ink to the painted exterior surface.

2. The method as in claim 1, wherein the item is an oil filter.

3. The method as in claim 2, wherein the item is an oil filter and the textured paint and indicia are applied to a housing of the oil filter and the housing is round.

4. The method as in claim 3, wherein the indicia is an ink and the textured paint is an electrostatic powdered paint that is cured prior to the application of the indicia.

5. The method as in claim 4, wherein the electrostatic powdered paint is a first color and the indicia is a second color, the first color being different from the second color.

6. The method as in claim 1, wherein the ink is an ultraviolet cured ink and the ink is cured by ultraviolet radiation at an ultraviolet curing station after applying the ink to the exterior surface of the item.

7. A method of applying indicia to an item having a textured surface, comprising:

applying a textured paint to an exterior round surface of an item via an electrostatic process;

curing the textured paint on the painted exterior round surface; and applying the indicia to the painted exterior round surface by an offset printing process after the textured paint has been cured, wherein the indicia is an ink that is first transferred to an etched anilox roll, which then transfers the ink to a plurality of pads and the plurality of pads apply the ink to the painted exterior round surface.

8. The method as in claim 7, wherein the item is an oil filter.

9. The method as in claim 7, wherein the item is an oil filter and the textured paint and indicia is applied to a housing of the oil filter and wherein the electrostatic powdered paint is a first color and the indicia is a second color, the first color being different from the second color.

10. The method as in claim 7, wherein the etched anilox roll has varying depths in a surface thereof so that larger amounts of ink can be applied to predetermined areas of the plurality of pads and the painted exterior round surface.

11. The method as in claim 10, wherein the painted exterior round surface is rotated as the ink is applied thereto.

12. The method as in claim 11, wherein the item is an oil filter.

13. The method as in claim 11, wherein the item is an oil filter and the textured paint and indicia is applied to a housing of the oil filter and wherein the electrostatic powdered paint is a first color and the indicia is a second color, the first color being different from the second color.

14. The method as in claim 7, wherein the ink is an ultraviolet cured ink and the ink is cured by ultraviolet radiation at an ultraviolet curing station after applying the ink to the painted exterior round surface of the item.

15. A method of applying indicia to an item having a textured surface, comprising:

applying a textured paint to an exterior surface of the item; and applying the indicia to the painted exterior surface by a dry offset printing process, wherein the indicia is an ink that is first transferred to an etched anilox roll, which then transfers the ink to a plurality of pads and the plurality of pads apply the ink to the painted exterior surface.

16. The method as in claim 15, wherein the item is an oil filter.

17. The method as in claim 16, wherein the item is an oil filter and the textured paint and indicia are applied to a housing of the oil filter and the housing is round.

18. The method as in claim 17, wherein the indicia is an ink and the textured paint is an electrostatic powdered paint that is cured prior to the application of the indicia.

19. The method as in claim 18, wherein the electrostatic powdered paint is a first color and the indicia is a second color, the first color being different from the second color.

\* \* \* \* \*